United States Patent
Souk

(10) Patent No.: US 9,694,493 B2
(45) Date of Patent: Jul. 4, 2017

(54) UMBILICAL MEMBER ARRANGEMENT STRUCTURE OF PARALLEL LINK ROBOT

(71) Applicant: FANUC CORPORATION, Minamitsuru-gun, Yamanashi (JP)

(72) Inventor: Hyunchul Souk, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 761 days.

(21) Appl. No.: 14/018,342

(22) Filed: Sep. 4, 2013

(65) Prior Publication Data

US 2014/0069222 A1    Mar. 13, 2014

Related U.S. Application Data

(60) Provisional application No. 61/697,973, filed on Sep. 7, 2012.

(30) Foreign Application Priority Data

Sep. 5, 2012    (JP) .................................. 2012-195221

(51) Int. Cl.
*B25J 9/00* (2006.01)
*B25J 19/00* (2006.01)

(52) U.S. Cl.
CPC ........... *B25J 9/0078* (2013.01); *B25J 9/0051* (2013.01); *B25J 19/0025* (2013.01); *Y10T 74/20311* (2015.01)

(58) Field of Classification Search
CPC ..... B25J 9/0051; B25J 9/0078; B25J 19/0025
USPC ...................................................... 74/490.02
See application file for complete search history.

(56) References Cited

U.S. PATENT DOCUMENTS

| 4,739,241 A | 4/1988 | Vachtsevanos et al. |
| 2001/0019692 A1* | 9/2001 | Ehrat ................... B25J 15/0616 414/735 |
| 2011/0097184 A1 | 4/2011 | Kinoshita et al. |
| 2014/0360306 A1* | 12/2014 | Mihara ................ B25J 19/0029 74/490.02 |

FOREIGN PATENT DOCUMENTS

| JP | 2004223635 A | 8/2004 |
| JP | 3153922 U | 9/2009 |
| JP | 2009-248288 A | 10/2009 |
| JP | 2010247238 A | 11/2010 |
| JP | 201188262 A | 5/2011 |
| JP | 2011-518052 A | 6/2011 |
| JP | 2013-39650 | * 2/2013 |

* cited by examiner

*Primary Examiner* — William C Joyce
(74) *Attorney, Agent, or Firm* — Hauptman Ham, LLP

(57) ABSTRACT

An umbilical member arrangement structure capable of properly arranging an umbilical member in a parallel link robot. A first additional actuator is arranged on a passive link part of a parallel link robot. An Umbilical member is withdrawn from an opening formed on a generally circular bottom surface of a base part, while having a margin, approaches the passive link part, while extending in an intersecting direction with respect to a longitudinal direction of the passive link part, and is connected to the first additional actuator. The "intersecting direction" means a direction extending at an angle of 70 to 110 degrees, preferably 80 to 100 degrees, more preferably about 90 degrees, with respect to the longitudinal direction of the passive link part.

6 Claims, 4 Drawing Sheets

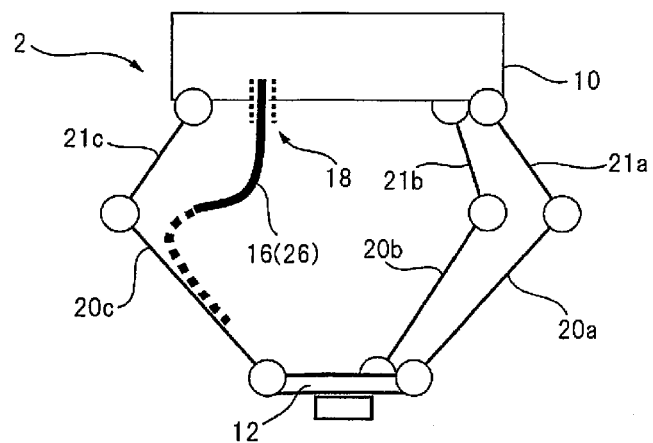
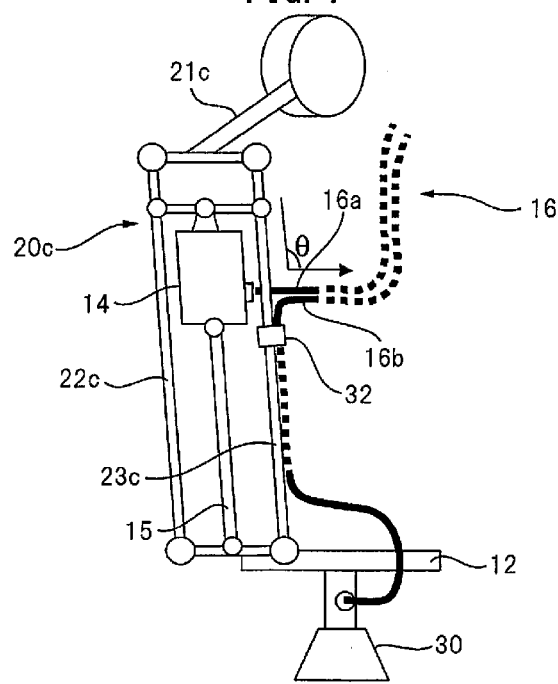

UMBILICAL MEMBER ARRANGEMENT STRUCTURE OF PARALLEL LINK ROBOT

BACKGROUND OF THE INVENTION

1. Field of the Invention

The preset invention relates to an arrangement structure for an umbilical member such as a cable and/or air tube, used in a parallel link robot.

2. Description of the Related Art

As means for positioning a movable part having an end effector in three-dimensions, a delta-type parallel link robot is well known. For example, FIG. 6 is a perspective view of a conventional parallel link robot. As shown in FIG. 6, conventional parallel link robot 100 has a base part 110, a movable part 120 and three link parts 200*a*, 200*b* and 200*c* for coupling base part 110 with movable part 120, wherein movable part 120 is provided with an attachment member 190 for an end effector (not shown).

Link part 200*a* is constituted by a drive link 210*a* extending from base part 110, and two passive links 220*a* and 230*a*, wherein the passive links are coupled to each other by means of a spherical bearing. Base part 110 has an actuator 130*a* for driving drive link 210*a*. The other link parts 200*b* and 200*c* have the same constitution as link part 200*a*. By individually controlling actuators 130*a*, 130*b* and 130*c* of respective link parts 200*a*, 200*b* and 200*c*, movable plate 120 is moved with three degrees-of-freedom (or first, second and third axes), whereby the movable plate can be positioned at an arbitrary place.

As described above, the conventional parallel link robot is constituted by the base part, the movable part, and the drive link and the passive link which couple the base part to the movable part. Three pairs of drive links and passive links are provided and each pair is individually controlled. Due to this, the movable part can be moved with three degrees-of-freedom.

In the parallel link robot of FIG. 6, a mechanism may be arranged to change the orientation of attachment member 190 to which the end effector is attached, and an actuator for driving the mechanism may be further added. For example, FIG. 2 of Japanese Unexamined Patent Publication (Kokai) No. 2011-088262 discloses a configuration wherein an additional actuator is positioned between two passive links.

When the additional actuator is used, it is necessary to arrange an umbilical member for the actuator, such as a cable or air tube, from the base part, and connect to the actuator. Therefore, it is necessary to arrange the umbilical member so as to not obstruct the motion of the robot. For example, FIG. 1 of Japanese Unexamined Patent Publication (Kokai) No. 2004-223635 discloses a configuration wherein wire/pipe 11 is held by a clamp member arranged on universal joint 5, and is connected to joint 20 of spindle head 2 via clamp member 19 arranged on ball screw 4. Further, FIG. 4 of Japanese Unexamined Patent Publication (Kokai) No. 2004-223635 discloses a configuration wherein wire/pipe 11 is connected spindle head 2 from clamp member 31 extending through ceiling part 7 via clamp member 32.

In FIG. 1 of Japanese Unexamined Patent Publication (Kokai) No. 2004-223635, the umbilical member projects outward from the parallel link mechanism, whereby a substantial area occupied by the mechanism becomes larger. Therefore, the umbilical member may interfere with external equipment, and may be damaged. On the other hand, in FIG. 4 of Japanese Unexamined Patent Publication (Kokai) No. 2004-223635, the umbilical member is contained within an interior area of the parallel link mechanism. However, as shown in FIG. 5, excessive stress may be applied to the umbilical member when the link mechanism is operated over a wide range.

SUMMARY OF THE INVENTION

Therefore, an object of the present invention is to provide an umbilical member arrangement structure capable of properly arranging an umbilical member in a parallel link robot.

According the present invention, an umbilical member arrangement structure for a parallel link robot is provided, comprising: a base part; a movable part positioned below the base part; and three link parts which connect the base part and the movable part, each link part including one degree-of-freedom relative to the base part, wherein each link part comprises a drive link connected to the base part, and a passive link part constituted by a pair of passive links parallel to each other which connect the drive link and the movable part, and wherein an umbilical member, which is withdrawn from an opening formed on a bottom surface of the base part, extends through a space in which the opening exists, the space being one of two spaces defined by a plane including a center axis of one of the pair of passive links and a center axis of the other of the pair of passive links, and then the umbilical member reaches a lateral side portion of one of the passive link parts while extending at an angle of 70 to 110 degrees with respect to a longitudinal direction of the one of the passive link parts.

In a preferred embodiment, the parallel link robot further comprises a first additional actuator positioned between the pair of passive links of the one of the passive link parts, wherein the umbilical member, which is withdrawn from the opening formed on the bottom surface of the base part, is connected to the first additional actuator while extending at an angle of 70 to 110 degrees with respect to a longitudinal direction of the one of the passive link parts.

In a preferred embodiment, the parallel link robot further comprises a second additional actuator positioned on the movable part, wherein the umbilical member, which is withdrawn from the opening formed on the bottom surface of the base part, is held by a clamp member positioned on the lateral side portion of the one of the passive link parts while extending at an angle of 70 to 110 degrees with respect to a longitudinal direction of the one of the passive link parts, and then the umbilical member is connected to the second additional actuator after extending along the longitudinal direction of the one of the passive link parts.

In a preferred embodiment, the parallel link robot further comprises an end effector positioned on the movable part, wherein the umbilical member, which is withdrawn from the opening formed on the bottom surface of the base part, is held by a clamp member positioned on the lateral side portion of the one of the passive link parts while extending at an angle of 70 to 110 degrees with respect to a longitudinal direction of the one of the passive link parts, and then the umbilical member is connected to the end effector after extending along the longitudinal direction of the one of the passive link parts.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 3 is a view schematically showing the umbilical member arrangement structure of the invention;

FIG. 4 is a view showing an application of the umbilical member arrangement structure of the invention;

DETAILED DESCRIPTIONS

Figure 1:
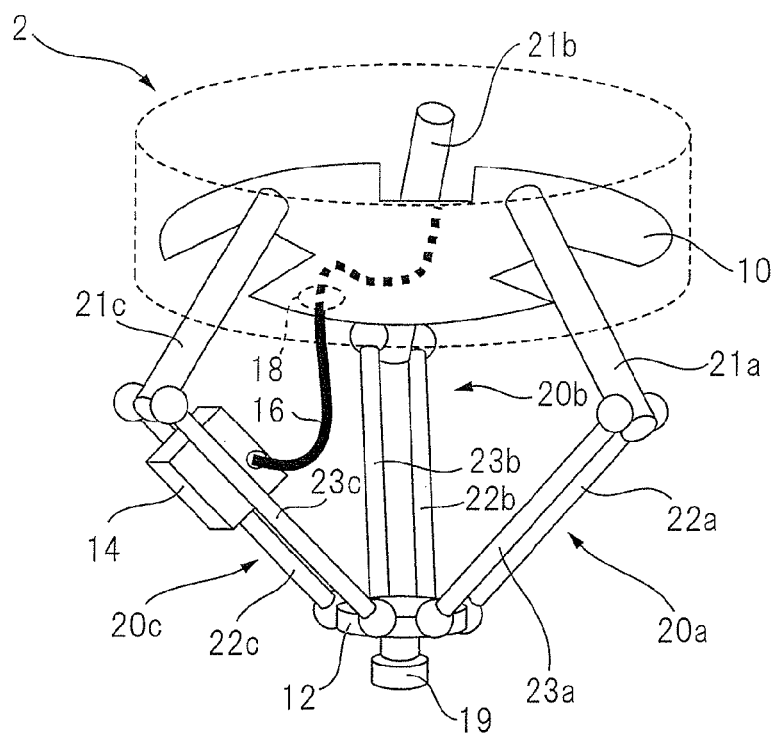
FIG. 1 is a view showing a basic configuration of an umbilical member arrangement structure according to a first embodiment of the invention.

FIG. 1 shows a schematic configuration of a delta-type parallel link robot having an umbilical member arrangement structure according to a first embodiment of the present invention. Parallel link robot 2 has a base part 10; a movable part 12 positioned below base part 10; and three link parts 20a, 20b and 20c which connect base part 10 and movable part 12, each link part including one degree-of-freedom relative to base part 10. In addition, movable part 12 is provided with an attachment member 19 for an end effector.

Figure 6:
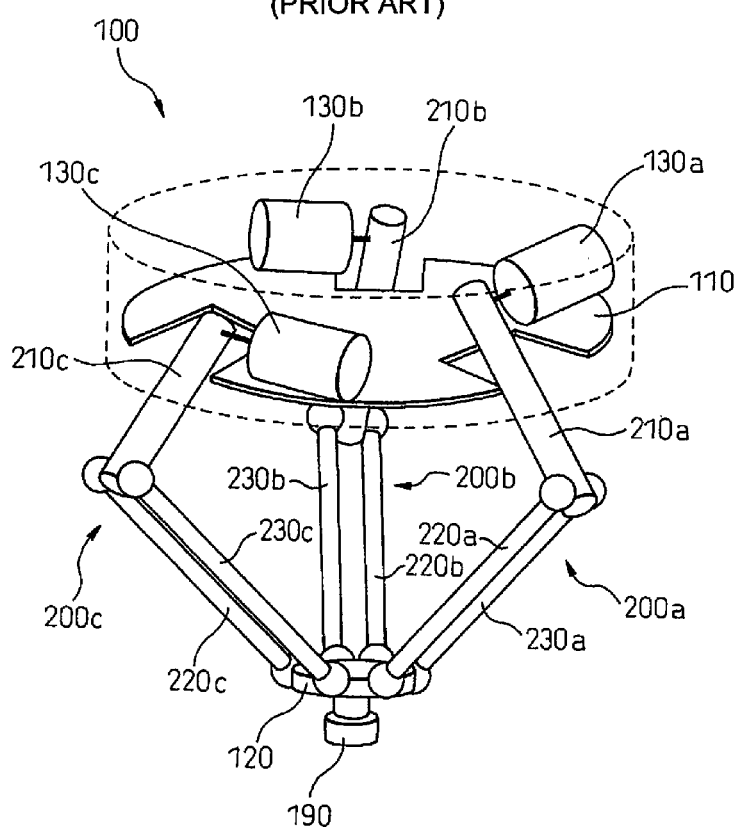
FIG. 6 is a perspective view of a conventional parallel link robot.

Link part 20a is constituted by a drive link 21a extending from base part 10, and a pair of (two in the embodiment) passive links 22a and 23a extending parallel to each other (hereinafter, the pair of passive links may be referred to as a "passive link part"), wherein these links are coupled to each other by means of a spherical bearing. Base part 10 has an actuator (not shown), which is similar to actuator 130a in FIG. 6, for actuating drive link 21a. Other link parts 20b and 20c may have the same configuration as link part 20a. By independently controlling actuators (not shown) of link parts 20a, 20b and 20c, movable part 12 is moved in three degrees-of-freedom (or by first, second and third axes), whereby the movable part can be positioned at a desired position. As such, parallel link robot 2 is constituted by base part 10, movable part 12, drive links 21a, 21b and 21c, and the passive link parts, wherein the drive links and the passive link parts connect movable part 12 to base part 10. Three sets of drive links and passive link parts are provided, and the movable part can be moved in three degrees-of-freedom (i.e., X, Y and Z axes) by independently controlling the three sets.

As shown in FIG. 1, a first additional actuator 14 may be arranged so as to change the orientation of movable part 12 (for example, so as to rotate the movable part). First additional actuator 14 is arranged on a lateral side of one of the three passive link parts (in the embodiment, the passive link part of link part 20c). Preferably, the actuator is positioned between passive links 22c and 23c, and is positioned at a portion (near base part 10) above an intermediate portion of the passive link part with respect to the longitudinal direction thereof. From first additional actuator 14, a power transmission shaft 15 (see FIG. 4 as explained below) extends parallel to passive links 22c and 23c, and is connected to movable part 12.

To first additional actuator 14, a flexible umbilical member 16, such as a tube and/or power cable for driving the actuator, is connected. Umbilical member 16 is withdrawn from an opening 18 formed on a generally circular bottom surface (or lower surface) of base part 10, extends through a space in which opening 18 exists, the space being one of two spaces defined by a plane including a center axis of passive link 22c and a center axis of passive link 23c, while having a margin, and then umbilical member 16 approaches the passive link part of link part 20c, while extending in an intersecting direction with respect to a longitudinal direction of passive links 22c and 23c, and connected to first additional actuator 14. In this regard, the "intersecting direction" means a direction extending at an angle of 70 to 110 degrees, preferably 80 to 100 degrees, more preferably about 90 degrees, with respect to the longitudinal direction of passive links 22c and 23c.

Figure 2:
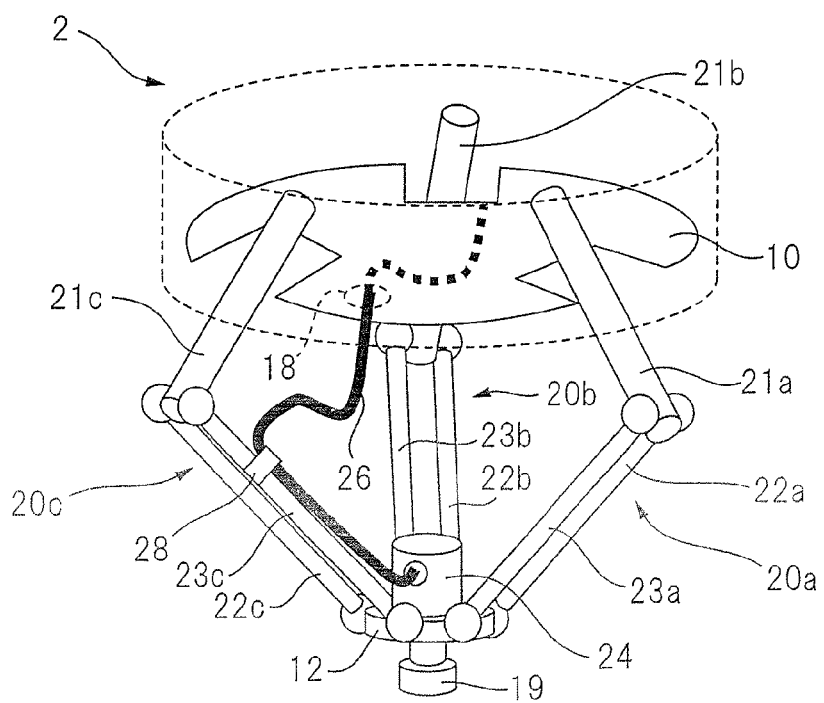
FIG. 2 is a view showing a basic configuration of an umbilical member arrangement structure according to a second embodiment of the invention.

FIG. 2 shows a schematic configuration of a delta-type parallel link robot having an umbilical member arrangement structure according to a second embodiment of the present invention. The second embodiment may be the same as the first embodiment except for an additional actuator and an arrangement structure as described below. Therefore, each component in the second embodiment having the same function as the first embodiment is provided with the same reference numeral as the first embodiment, and the detailed explanation thereof is omitted.

In the second embodiment as shown in FIG. 2, instead of first additional actuator 14 in FIG. 1, a second additional actuator 24 is positioned on the upper part of movable part 12, as a means for changing the orientation of the movable part. A flexible umbilical member 26, such as a tube and/or power cable for driving second actuator 24, is withdrawn from opening 18 formed on the lower surface of base part 10, extends through a space in which opening 18 exists, the space being one of two spaces defined by a plane including a center axis of passive link 22c and a center axis of passive link 23c, while having a margin, and then umbilical member 26 is held by a clamp member 28 positioned on the lateral side portion of the passive link part of link part 20c (preferably, at a portion (near base part 10) above an intermediate portion of the passive link part with respect to the longitudinal direction thereof), extends along the longitudinal direction of passive links 22c and 23c, and then is connected to second additional actuator 24. Before being held by clamp member 28, umbilical member 26 approaches the passive link part of link part 20c, while extending in an intersecting direction with respect to a longitudinal direction of passive links 22c and 23c. In this regard, the "intersecting direction" means a direction extending at an angle of 70 to 110 degrees, preferably 80 to 100 degrees, more preferably about 90 degrees, with respect to the longitudinal direction of passive links 22c and 23c.

Clamp member 28 may be configured to fix umbilical member 26. Alternatively, clamp member 28 may be configured so that umbilical member 26 can freely rotate or slide in the longitudinal direction within the member. For example, clamp member 28 may be a ring member having an inner diameter larger than an outer diameter of umbilical member. Clamp members 32 and 34 as described below may have the same configuration as clamp member 28. Further, in any embodiment, a clamp member configured to fix umbilical member 26, or a member configured so that umbilical member 26 can freely rotate or slide in the longitudinal direction within the member, may be arranged at opening 18.

FIG. 3 schematically shows the embodiment of FIGS. 1 and 2. As shown in FIG. 3, umbilical member 16 (26), withdrawn from opening 18 formed on the lower part of base part 10, extends through a space in which opening 18 exists, the space being one of two spaces defined by a plane including a center axis of passive link 22c and a center axis of passive link 23c, while having a margin, and then the umbilical member approaches the lateral side portion of one passive link part (in this case, the passive link part of link part 20c) (preferably, at a portion (near base part 10 or drive link 21c) above an intermediate portion of the passive link part with respect to the longitudinal direction thereof), while extending in an intersecting direction with respect to a longitudinal direction of the passive link part. By virtue of such an arrangement of the umbilical member, the umbilical member can follow the motion of movable part 12 or the link mechanism, without being subject to excessive stress. Since the umbilical member does not project beyond a movable range of the link, an area occupied by the robot may be minimized and the robot is prevented from interfering with peripherals. Further, due to such an arrangement of the umbilical member, even when the link mechanism is operated within a movable range thereof, the extending direction of the umbilical member relative to one passive link part is not significantly varied. However, in order to shorten the umbilical member as possible, it is preferable that the position of opening 18 on the bottom surface of base part 10 be inside of a region defined by a circle extending through a portion where each drive link is connected to the base part, and be more close to the passive link part, to which the umbilical member approaches, than the center of the bottom surface of the base part.

FIG. 4 is a view showing an application of the invention, wherein umbilical member 16 is connected to first additional actuator 14 as explained in the first embodiment, and further, is connected to an end effector 30 attached to an attachment member 19. Concretely, umbilical member 16 is constituted by an umbilical member 16a including a cable, etc., for first additional actuator 14, and an umbilical member 16b including an air tube, etc., for end effector 30. As explained in FIG. 1, umbilical member 16a is connected to first additional actuator 14. On the other hand, umbilical member 16b is arranged similarly to umbilical member 16a before reaching the passive link part of link part 20c, and is held by clamp member 32 positioned on the lateral side portion of the passive link part of link part 20c (preferably, at a portion (near base part 10) above an intermediate portion of the passive link part with respect to the longitudinal direction thereof), extends along the longitudinal direction of passive links 22c and 23c, and then is connected to end effector 30.

As shown in FIG. 4, umbilical members 16a and 16b are also withdrawn from opening 18, extends through a space in which opening 18 exists, the space being one of two spaces defined by a plane including a center axis of passive link 22c and a center axis of passive link 23c, while having a margin, and then the umbilical members approach the passive link part of link part 20c, while extending in an intersecting direction with respect to a longitudinal direction of passive links 22c and 23c. In this regard, the "intersecting direction" means a direction extending at an angle θ of 70 to 110 degrees, preferably 80 to 100 degrees, more preferably about 90 degrees, with respect to the longitudinal direction of passive links 22c and 23c. Therefore, also in the embodiment of FIG. 4, both umbilical members 16a and 16b can properly follow the motion of the movable part or the link mechanism.

Figure 5:
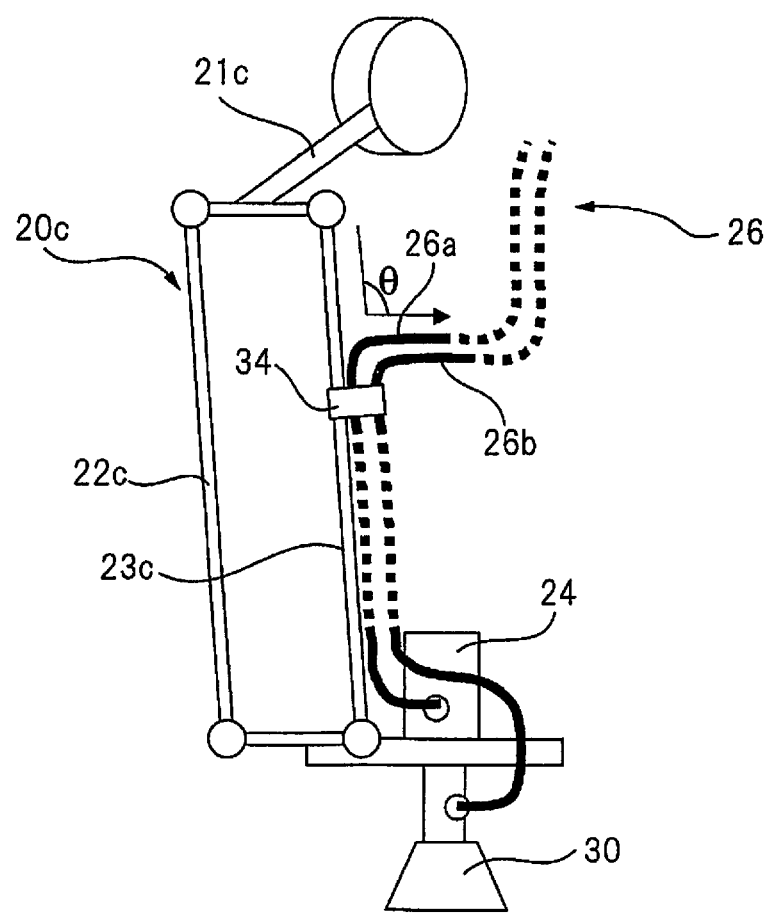
FIG. 5 is a view showing another application of the umbilical member arrangement structure of the invention.

FIG. 5 is a view showing another application of the invention, wherein umbilical member 26 is connected to second additional actuator 24 as explained in the second embodiment, and further, is connected to end effector 30 attached to attachment member 19. Concretely, umbilical member 26 is constituted by an umbilical member 26a including a cable, etc., for second additional actuator 24, and an umbilical member 26b including an air tube, etc., for end effector 30. Umbilical member 26a is held by clamp member 34 positioned on the lateral side portion of the passive link part of link part 20c (preferably, at a portion (near base part 10) above an intermediate portion of the passive link part with respect to the longitudinal direction thereof), and is connected to second additional actuator 24. On the other hand, umbilical member 26b is arranged similarly to umbilical member 26a before reaching the passive link part of link part 20c, is held by clamp member 34, extends along the longitudinal direction of passive links 22c and 23c, and then is connected to end effector 30.

As shown in FIG. 5, umbilical members 26a and 26b are also withdrawn from opening 18, extends through a space in which opening 18 exists, the space being one of two spaces defined by a plane including a center axis of passive link 22c and a center axis of passive link 23c, while having a margin, and then the umbilical members approach the passive link part of link part 20c, while extending in an intersecting direction with respect to a longitudinal direction of passive links 22c and 23c. In this regard, the "intersecting direction" means a direction extending at an angle θ of 70 to 110 degrees, preferably 80 to 100 degrees, more preferably about 90 degrees, with respect to the longitudinal direction of passive links 22c and 23c. Therefore, also in the embodiment of FIG. 5, both umbilical members 26a and 26b can properly follow the motion of the movable part or the link mechanism.

Although not shown, an embodiment wherein the additional actuator is not arranged and the umbilical member connected to the end effector only is arranged, may be possible. This embodiment corresponds to the embodiment of FIG. 4 wherein first additional actuator 14 and umbilical member 16a are deleted, or to the embodiment of FIG. 5 wherein second additional actuator 24 and umbilical member 26a are deleted.

In the above embodiment, the space, through which the umbilical member 16 withdrawn from opening 18 extends until reaching the lateral side portion of one passive link part, is defined as a space in which opening 18 exists, the space being one of two spaces defined by a plane including a center axis of passive link 22c and a center axis of passive link 23c. However, another space may be used as the above space. For example, a space, in which opening 18 exists, defined by three planes (i.e., a plane including center axes of passive links 22a and 23a, a plane including center axes of passive links 22b and 23b, and a plane including center axes of passive links 22c and 23c), may be used. Alternatively, a space, defined within a cylindrical area extending in the vertical direction, including an outermost portion of the robot when viewed from the above (in the embodiment, a joint which connects the drive link and the passive link), may be used. Alternatively, a sweep space, defined by the drive link and the passive link when the robot is rotated about a vertical axis extending through the center of the circular base part, may be used.

According to the umbilical arrangement structure of the present invention, the umbilical member, including the wire and/or the tube connected to the additional actuator or the end effector of the parallel link robot, can be contained within a movable area of the link. By virtue of the arrangement structure, an area occupied by the robot can be minimized, while the umbilical member can follow the motion of the movable part or the link without being subject to excessive stress. Further, the robot is prevented from interfering with external equipment, etc., and thus the umbilical member is prevented from being damaged, whereby a life thereof can be extended.

While the invention has been described with reference to specific embodiments chosen for the purpose of illustration, it should he apparent that numerous modifications could be made thereto, by one skilled in the art, without departing from the basic concept and scope of the invention.

The invention claimed is:

1. An umbilical member arrangement structure for a parallel link robot, comprising:
an umbilical member;
a clamp member;
a base part;
a movable part positioned below the base part; and
three link parts which connect the base part and the movable part, each of the three link parts including one degree-of-freedom relative to the base part,
wherein each of the three link parts comprises
a drive link connected to the base part, and
a passive link part constituted by a pair of passive links which are parallel to each other and connect the drive link and the movable part,
wherein an opening is formed on a bottom surface of the base part and exists in one of two spaces defined by a plane including center axes of the pair of passive links of one of the three link parts,
wherein the umbilical member is withdrawn from the opening, the umbilical member then extends through the space in which the opening exists, resulting in being parallel with the plane, and then the umbilical member reaches a lateral side portion of one of the passive link parts while extending, in a plane existing in the space, at an angle of 70 to 110 degrees with respect to a longitudinal direction of the one of the passive link parts,
wherein the umbilical member is held by the clamp member which is positioned on the lateral side portion of the one of the passive link parts, and
wherein the clamp member is closer to a joint, which connects the one of the passive link parts to the corresponding drive link, than to the movable part.

2. The umbilical member arrangement structure as set forth in claim 1, further comprising a further umbilical member,
wherein the parallel link robot further comprises an actuator positioned between the pair of passive links of the one of the passive link parts, and
wherein the further umbilical member is withdrawn from the opening formed on the bottom surface of the base part, becomes parallel with the plane and is connected to the actuator while extending, in a plane existing in the space, at an angle of 70 to 110 degrees with respect to the longitudinal direction of the one of the passive link parts.

3. The umbilical member arrangement structure as set forth in claim 2,
wherein the parallel link robot further comprises an end effector positioned on the movable part, and
wherein the umbilical member, which is withdrawn from the opening formed on the bottom surface of the base part, becomes parallel with the plane and is held by the clamp member while extending, in a plane existing in the space, at an angle of 70 to 110 degrees with respect to the longitudinal direction of the one of the passive link parts, and then the umbilical member is connected to the end effector after extending along the longitudinal direction of the one of the passive link parts.

4. The umbilical member arrangement structure as set forth in claim 1,
wherein the parallel link robot further comprises an actuator positioned on the movable part, and
wherein the umbilical member, which is withdrawn from the opening formed on the bottom surface of the base part, becomes parallel with the plane and is held by the clamp member while extending, in a plane existing in the space, at an angle of 70 to 110 degrees with respect to the longitudinal direction of the one of the passive link parts, and then the umbilical member is connected to the actuator after extending along the longitudinal direction of the one of the passive link parts.

5. The umbilical member arrangement structure as set forth in claim 4, further comprising a further umbilical member,
wherein the parallel link robot further comprises an end effector positioned on the movable part, and
wherein the further umbilical member, which is withdrawn from the opening formed on the bottom surface of the base part, becomes parallel with the plane and is held by the clamp member while extending, in a plane existing in the space, at an angle of 70 to 110 degrees with respect to the longitudinal direction of the one of the passive link parts, and then the further umbilical member is connected to the end effector after extending along the longitudinal direction of the one of the passive link parts.

6. The umbilical member arrangement structure as set forth in claim 1,
wherein the parallel link robot further comprises an end effector positioned on the movable part, and
wherein the umbilical member, which is withdrawn from the opening formed on the bottom surface of the base part, becomes parallel with the plane and is held by the clamp member while extending, in a plane existing in the space, at an angle of 70 to 110 degrees with respect to the longitudinal direction of the one of the passive link parts, and then the umbilical member is connected to the end effector after extending along the longitudinal direction of the one of the passive link parts.

* * * * *